(12) United States Patent
Nedungadi et al.

(10) Patent No.: US 11,968,081 B2
(45) Date of Patent: Apr. 23, 2024

(54) METHODS AND SYSTEMS FOR NETWORK DEVICE MANAGEMENT USING A NEIGHBORING NETWORK DEVICE AS A PROXY

(71) Applicant: Nile Global, Inc., San Jose, CA (US)

(72) Inventors: Promode Nedungadi, San Jose, CA (US); Sumanth Narayana Reddy, Bangalore (IN); Ganesh Sathyanarayanan, Bangalore (IN)

(73) Assignee: NILE GLOBAL, INC., San Jose, CA (US)

( * ) Notice: Subject to any disclaimer, the term of this patent is extended or adjusted under 35 U.S.C. 154(b) by 197 days.

(21) Appl. No.: 17/579,476

(22) Filed: Jan. 19, 2022

(65) Prior Publication Data

US 2023/0231763 A1    Jul. 20, 2023

(51) Int. Cl.
| | | |
|---|---|---|
| G06F 11/07 | (2006.01) | |
| G06F 11/36 | (2006.01) | |
| H04L 41/0604 | (2022.01) | |
| H04L 41/0631 | (2022.01) | |
| H04L 41/0668 | (2022.01) | |
| G06F 11/22 | (2006.01) | |
| H04L 101/622 | (2022.01) | |

(52) U.S. Cl.
CPC ...... *H04L 41/0668* (2013.01); *G06F 11/3656* (2013.01); *H04L 41/0627* (2013.01); *H04L 41/065* (2013.01); *G06F 11/0793* (2013.01); *G06F 11/2294* (2013.01); *H04L 2101/622* (2022.05)

(58) Field of Classification Search
CPC ............... G06F 11/3656; H04L 41/065; H04L 41/0668; H04L 41/0627
See application file for complete search history.

(56) References Cited

U.S. PATENT DOCUMENTS

| | | | |
|---|---|---|---|
| 7,720,006 B1 | 5/2010 | Yadav | |
| 10,142,860 B2 | 11/2018 | Jain et al. | |
| 11,159,963 B2 * | 10/2021 | Malik | ..................... H04W 4/80 |
| 2003/0064719 A1 | 4/2003 | Horne | |
| 2008/0089244 A1 | 4/2008 | Yu | |

(Continued)

OTHER PUBLICATIONS

"How (and Why) to Change Your MAC Address on Windows, Linux, and Mac" by Chris Hoffman published Jun. 22, 2017 https://www.howtogeek.com/192173/how-and-why-to-change-your-mac-address-on-windows-linux-and-mac/ (Year: 2017).*

(Continued)

*Primary Examiner* — Joseph O Schell
(74) *Attorney, Agent, or Firm* — LOZA & LOZA, LLP

(57) ABSTRACT

Embodiments of a device and method are disclosed. In an embodiment, a method for network device troubleshooting involves at a cloud server, connecting to a neighboring network device of a faulty network device, where the neighboring network device and the faulty network device are located within a network deployed at a customer site, and where the neighboring network device communicates with the faulty network device according to a short-range wireless communications protocol, and at the cloud server, performing a network device troubleshooting operation on the faulty network device using the neighboring network device as a proxy.

16 Claims, 8 Drawing Sheets

At a cloud server, connect to a neighboring network device of a faulty network device, where the neighboring network device and the faulty network device are located within a network deployed at a customer site, and where the neighboring network device communicates with the faulty network device according to a short-range wireless communications protocol ~802

At the cloud server, perform a network device troubleshooting operation on the faulty network device using the neighboring network device as a proxy ~804

(56) References Cited

U.S. PATENT DOCUMENTS

| | | | | |
|---|---|---|---|---|
| 2012/0084598 | A1* | 4/2012 | Alibakhsh | H04L 67/1001 |
| | | | | 714/4.11 |
| 2013/0041776 | A1* | 2/2013 | Schunemann | G06Q 20/20 |
| | | | | 705/26.1 |
| 2013/0250931 | A1* | 9/2013 | Abraham | H04W 28/021 |
| | | | | 370/338 |
| 2015/0237666 | A1 | 8/2015 | Cho | |
| 2016/0065410 | A1* | 3/2016 | Brunet | H04L 67/303 |
| | | | | 709/221 |
| 2016/0093166 | A1* | 3/2016 | Panambur | G06Q 20/3278 |
| | | | | 463/25 |
| 2016/0350166 | A1 | 12/2016 | Andrews et al. | |
| 2017/0359190 | A1* | 12/2017 | Nadathur | H04L 67/303 |
| 2020/0081811 | A1* | 3/2020 | Matsuda | G06F 3/14 |
| 2020/0241945 | A1* | 7/2020 | Sterioff | G06F 11/0787 |
| 2021/0112009 | A1 | 4/2021 | Takashige et al. | |
| 2021/0168066 | A1* | 6/2021 | Arvidson | H04W 40/00 |
| 2021/0250350 | A1 | 8/2021 | Zakaria | |
| 2022/0394436 | A1* | 12/2022 | Jain | H04W 4/38 |

OTHER PUBLICATIONS

"Understanding Bluetooth Security" by Mark Loveless published Jan. 9, 2018 https://duo.com/decipher/understanding-bluetooth-security (Year: 2018).*

PCT/US2023/011073, International Search Report and Written Opinion, dated May 16, 2023, 22 pgs.

* cited by examiner

METHODS AND SYSTEMS FOR NETWORK DEVICE MANAGEMENT USING A NEIGHBORING NETWORK DEVICE AS A PROXY

BACKGROUND

Network management, for example, network troubleshooting, plays an important role in ensuring that network deployments and/or designs meet customer requirements. Typically, network management, for example, network troubleshooting, is performed by examining data communications with a specific network device in order to identify a network issue, which typically requires network connections between the specific network device and a remote management server. However, network connections between a specific network device and a remote management server may be lost or compromised, which causes network management, for example, network troubleshooting, by examining data communications with the specific network device unfeasible. Therefore, there is a need for network management technology (e.g., network troubleshooting technology) that can provide effective network management (e.g., network troubleshooting) when network connections between network devices and a remote management server are lost or compromised.

SUMMARY

Embodiments of a device and method are disclosed. In an embodiment, a method for network device troubleshooting involves at a cloud server, connecting to a neighboring network device of a faulty network device, where the neighboring network device and the faulty network device are located within a network deployed at a customer site, and where the neighboring network device communicates with the faulty network device according to a short-range wireless communications protocol, and at the cloud server, performing a network device troubleshooting operation on the faulty network device using the neighboring network device as a proxy. Other embodiments are also described.

In an embodiment, the short-range wireless communications protocol includes a Bluetooth (BT) or Bluetooth Low Energy (BLE) communications protocol, and at the cloud server, performing the network device troubleshooting operation on the faulty network device using the neighboring network device as the proxy includes transmitting an instruction to be executed by the faulty network device to the neighboring network device.

In an embodiment, at the cloud server, performing the network device troubleshooting operation on the faulty network device using the neighboring network device as the proxy further includes causing the neighboring network device to turn on a BT or BLE transceiver to connect to a corresponding BT or BLE transceiver of the faulty network device under a client mode.

In an embodiment, at the cloud server, performing the network device troubleshooting operation on the faulty network device using the neighboring network device as the proxy includes causing the neighboring network device to forward the instruction to the faulty network device, after the neighboring network device is successfully connected to the faulty network device under the client mode.

In an embodiment, the instruction includes a media access control (MAC) address of the faulty network device.

In an embodiment, at the cloud server, performing the network device troubleshooting operation on the faulty network device using the neighboring network device as the proxy includes at the cloud server, receiving execution result information of the instruction by the faulty network device from the neighboring network device.

In an embodiment, the method further includes at the cloud server, generating a BT or BLE reachability database of the network.

In an embodiment, the method further includes at the cloud server, selecting the neighboring network device from BT or BLE capable network devices in vicinity of the faulty network device based on the BT or BLE reachability database when the faulty network device loses connectivity to the cloud server.

In an embodiment, at the cloud server, selecting the neighboring network device from the BT or BLE capable network devices in vicinity of the faulty network device based on the BT or BLE reachability database when the faulty network device loses connectivity to the cloud server includes at the cloud server, iterating through the BT or BLE capable network devices in vicinity of the faulty network device, one network device at a time.

In an embodiment, the method further includes at the cloud server, authenticating the neighboring network device to establish a secured connection with the neighboring network device.

In an embodiment, a cloud server includes a network management module configured to connect to a neighboring network device of a faulty network device, where the neighboring network device and the faulty network device are located within a network deployed at a customer site, and where the neighboring network device communicates with the faulty network device according to a short-range wireless communications protocol, and perform a network device troubleshooting operation on the faulty network device using the neighboring network device as a proxy, and a network management database connected to the network management module and configured to store a short-range wireless reachability database of the network.

In an embodiment, the short-range wireless communications protocol includes a BT or BLE communications protocol, and the network management module is further configured to transmit an instruction to be executed by the faulty network device to the neighboring network device.

In an embodiment, the network management module is further configured to cause the neighboring network device to turn on a BT or BLE transceiver to connect to a corresponding BT or BLE transceiver of the faulty network device under a client mode.

In an embodiment, the network management module is further configured to cause the neighboring network device to forward the instruction to the faulty network device, after the neighboring network device is successfully connected to the faulty network device under the client mode.

In an embodiment, the instruction includes a MAC address of the faulty network device.

In an embodiment, the network management module is further configured to receive execution result information of the instruction by the faulty network device from the neighboring network device.

In an embodiment, the short-range wireless reachability database includes a BT or BLE reachability database of the network, and the network management module is further configured to select the neighboring network device from a plurality of BT or BLE capable network devices in vicinity of the faulty network device based on the BT or BLE reachability database when the faulty network device loses connectivity to the cloud server.

In an embodiment, the network management module is further configured to iterate through the BT or BLE capable network devices in vicinity of the faulty network device, one network device at a time.

In an embodiment, the network management module is further configured to authenticate the neighboring network device to establish a secured connection with the neighboring network device.

In an embodiment, a network device includes a controller configured to receive a notification of a faulty network device in vicinity of the network device from a cloud server, and a short-range wireless transceiver configured to connect to a corresponding short-range wireless transceiver of the faulty network device under a client mode, receive an instruction to be executed by the faulty network device from the cloud server and forward the instruction to the faulty network device after the network device is successfully connected to the faulty network device under the client mode, and receive execution result information of the instruction by the faulty network device.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
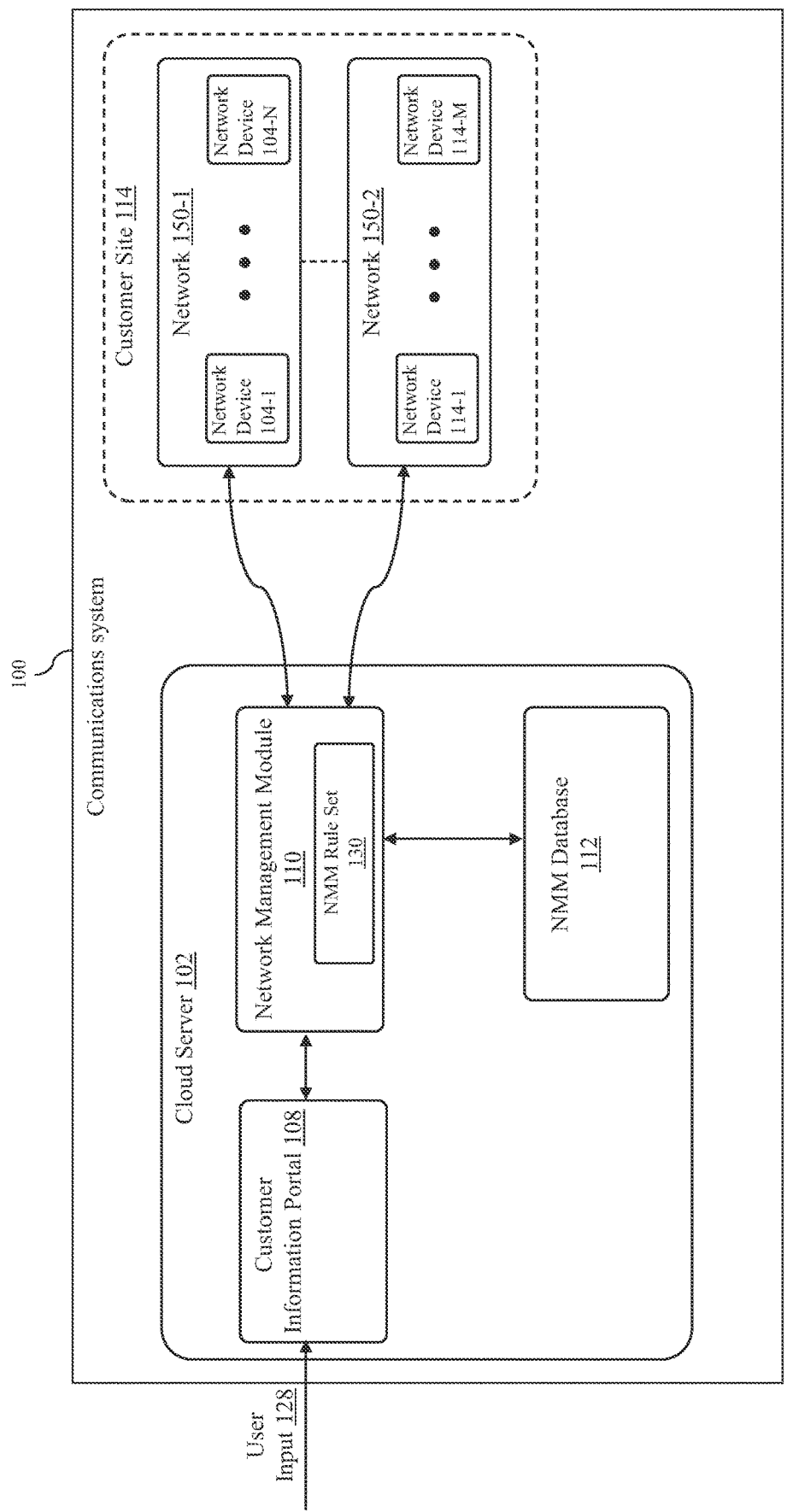
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and two deployed networks 150-1, 150-2 within a customer site 114. The cloud server and/or the networks may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than two deployed networks, and/or more than one customer site. In another example, in some embodiments, the communications system includes one deployed network. In another example, although the cloud server and the deployed networks are shown in FIG. 1 as being connected in certain topology, the network topology of the communications system 100 is not limited to the topology shown in FIG. 1.

The cloud server 102 can be used to provide at least one service to a customer site (e.g., to the deployed networks 150-1, 150-2 located at the customer site 114). The cloud server may be configured to facilitate or perform a network management service (e.g., a network troubleshooting service or a network diagnostic service) to network devices (e.g., the deployed networks 150-1, 150-2) at the customer site. Because the cloud server can facilitate or perform a network management service or operation for network devices at the customer site, network management efficiency can be improved. In addition, because the cloud server can facilitate or perform a network management service or operation for network devices at the customer site, a user or customer of the customer site can be notified of a device and/or network outage. Consequently, device and/or network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management module (NMM) 110, a customer information portal 108 connected to the NMM module 110, and an NMM database 112 configured to store NMM data. The NMM module, the customer information portal, and/or the NMM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NMM module, more than one customer information portal, and/or more than one NMM database. In another example, although the NMM module, the customer information portal, and the NMM database are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NMM module 110 is configured to facilitate or perform an NMM service (e.g., a network troubleshooting service or a network diagnostic service) to network devices (e.g., the deployed networks 150-1, 150-2) at the customer site 114, for example, using an NMM rule set 130. The NMM rule set 130 may include one or more NMM rules (e.g., network troubleshooting rules or network diagnostic rules) for network devices at the customer site 114, for example, for performing an NMM service (e.g., a network troubleshooting service or a network diagnostic service) to network devices at the customer site 114. In some embodiments, the NMM module 110 is configured to generate and/or transmit at least one alert (e.g., a device outage alert or a network throughput alert) regarding a network deployed and/or to be deployed at the customer site or a network operator site, for example, to an administrator or a user or customer (e.g., a layperson such as a worker on-site or an end-user such as an employee) at the customer site 114. In some embodiments, the NMM database 112 is configured to store NMM data for a network deployed and/or to be deployed at the customer site (e.g., a list of network devices deployed or to be deployed at the customer site). In some embodiments, the NMM database 112 is configured to store the at least one NMM alert. Because the NMM module can facilitate or perform network diagnostic for network devices at the customer site, network diagnostic efficiency can be improved. In addition, because the NMM deployment module can facilitate or perform a network management service or operation for network devices at the customer site, an administrator or a customer can be notified of device and/or network conditions or outages. Consequently, device and/or network outage or low performance time can be shortened. The customer information portal 108 is configured to receive user input 128. In some embodiments, the customer information portal is configured to include or generate a user interface that allows a customer to input information related to the customer site 114 (e.g., the floor plan of the customer site 114) and/or information associated with an NMM service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150-1 includes one or more network devices 104-1, . . . , 104-N, where N is a positive integer, while the network 150-2 includes one or more network devices 114-1, . . . , 114-M, where M is a positive integer. In some embodiments, at least one of the one or more network devices 104-1, . . . , 104-N, 114-1, . . . , 114-M is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N, 114-1, . . . , 114-M is compatible with Institute of Electrical and Electronics Engineers (IEEE) 802.3 protocol and/or one or more wireless local area network (WLAN) communications protocols, such as IEEE 802.11 protocol, and/or a short-range communications protocol, such as Bluetooth. In some embodiments, at least one of the one or more network devices 104-1, . . . , 104-N, 114-1, . . . , 114-M is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N, 114-1, . . . , 114-M is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N, 114-1, . . . , 114-M is a wireless station (STA) that wirelessly connects to a wireless AP. For example, at least one of the one or more network devices 104-1, . . . , 104-N, 114-1, . . . , 114-M may be a laptop, a desktop personal computer (PC), a mobile phone, or other wireless device that supports at least one WLAN communications protocol (e.g., an IEEE 802.11 protocol)).

Figure 2:
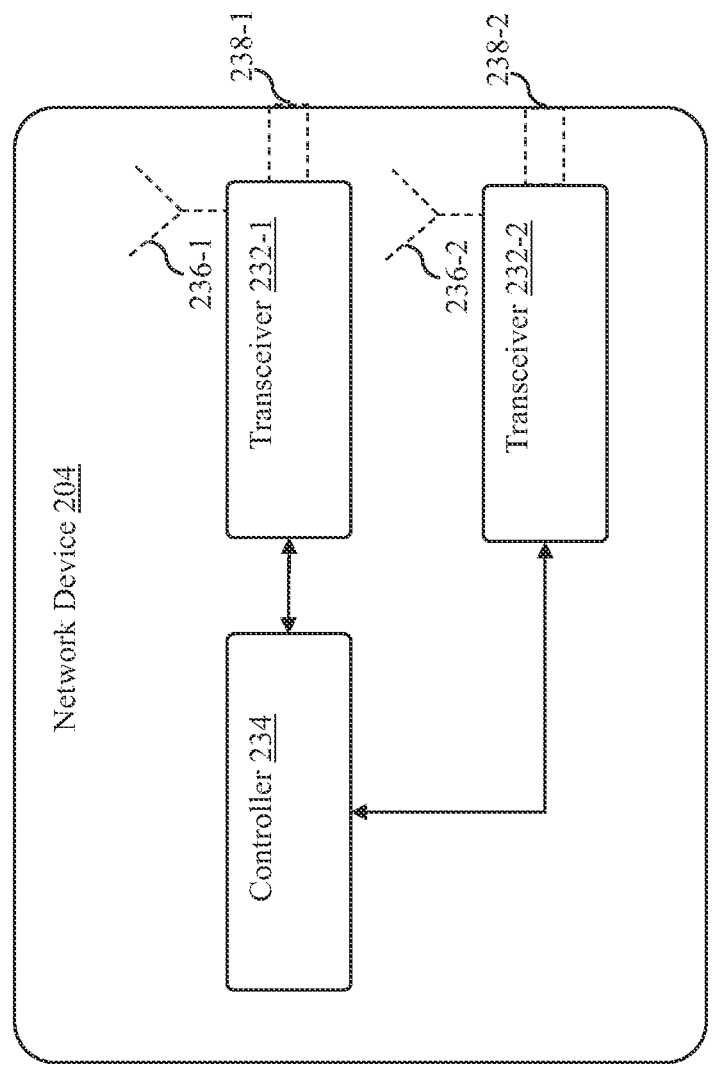
FIG. 2 depicts an embodiment of a network device of the communications system depicted in FIG. 1.

FIG. 2 depicts an embodiment of a network device 204 of the communications system 100 depicted in FIG. 1. The network device 204 may be an embodiment of a network device that is included in the deployed networks 150-1, 150-2 depicted in FIG. 1. However, network devices that can be included in the deployed networks 150-1, 150-2 depicted in FIG. 1 are not limited to the embodiment depicted in FIG. 2. The network device 204 may be any suitable type of network device. For example, the network device 204 may be a distribution switch, a gateway, an access switch, a wireless access point, or a sensor. In the embodiment depicted in FIG. 2, a network device 204 includes a first wireless and/or wired transceiver 232-1, at least one antenna 236-1 operably connected to the first transceiver 232-1, at least one optional network port 238-1 operably connected to the first transceiver 232-1, a second wireless and/or wired transceiver 232-2, at least one antenna 236-2 operably connected to the second transceiver 232-2, at least one optional network port 238-2 operably connected to the first transceiver 232-2, and a controller 234 operably connected to the transceivers 232-1, 232-2. In some embodiments, at least one of the transceivers 232-1, 232-2 includes a physical layer (PHY) device. Each of the transceivers 232-1, 232-2 may be any suitable type of transceiver. For example, each of the transceivers 232-1, 232-2 may be a short-range communications transceiver (e.g., a Bluetooth or Bluetooth Low Energy (BLE) transceiver) or a WLAN transceiver (e.g., a transceiver compatible with an IEEE 802.11 protocol). In some embodiments, the network device 204 includes multiple transceivers, for example, a short-range communications transceiver (e.g., a Bluetooth or BLE transceiver) and a WLAN transceiver (e.g., a transceiver compatible with an IEEE 802.11 protocol). For example, the first transceiver 232-1 is a WLAN transceiver (e.g., a transceiver compatible with an IEEE 802.11 protocol) while the second transceiver 232-2 is a short-range communications transceiver (e.g., a Bluetooth or BLE transceiver). In some embodiments, the network device (e.g., a wireless AP) includes multiple antennas and multiple wireless transceivers that share the antennas. In some embodiments, the controller 234 is configured to control the transceivers 232-1, 232-2 to process packets received through the antennas 236-1, 236-2 and/or the network ports 238-1, 238-2 and/or to generate outgoing packets to be transmitted through the antennas 236-1, 236-2 and/or the network ports 238-1, 238-2. In some embodiments, the controller 234 is configured to obtain and/or store network information relevant to the network device 204. For example, the controller 234 may be configured to obtain and/or store network information (e.g., routing information such as a routing table) relevant to the network device 204. Each of the antennas 236-1, 236-2 may be any suitable type of antenna. For example, each of the antennas 236-1, 236-2 may be an induction type antenna such as a loop antenna or any other suitable type of induction type antenna. However, the antennas 236-1, 236-2 are not limited to an induction type antenna. Each of the network ports 238-1, 238-2 may be any suitable type of port. For example, each of the network ports 238-1, 238-2 may be a local area network (LAN) network port such as an Ethernet port. However, the network ports 238-1, 238-2 are not limited to LAN network ports.

Among short-range wireless communications protocols, Bluetooth and the functionally equivalent Bluetooth Low Energy (BLE) is an Industry standard secure protocol for sending and receiving data via a 2.4 GHz wireless link, designed suited for short range, low power, low-cost links. Conventional networking and related computer systems use physically wired interfaces, such as, RS232, RS485, Universal Serial Bus (USB) for console port to conduct low level control and management of the system and for maintenance and troubleshooting. With a Bluetooth or BLE transceiver, the network device 204 can replace a conventional wired interface for console with a wireless interface using Bluetooth or BLE. For example, a network device (e.g., the network device 204) can use a Bluetooth or BLE transceiver with a Bluetooth or BLE interfaces in a secure client-server connection mode. When direct connectivity between the cloud server 102 (e.g., the network management module 110) and a network device in trouble is lost, the cloud server 102 (e.g., the network management module 110) can uses a neighbor system's Bluetooth or BLE interface paired with the network device in trouble, which has lost the connectivity to the cloud server 102 (e.g., the network management module 110), to establish a secure low level management connection for remote troubleshooting. For example, the BT/BLE transceiver or interface of a network device (e.g., the network device 204) can be used as an alternative to a standard Console/Management ethernet for on-field interaction with the cloud server 102 (e.g., the network management module 110). The BT/BLE receiver of a network device (e.g., the network device 204) may receive configuration if needed and other commands (e.g., debug/troubleshooting commands) pushed from the cloud server 102 (e.g., the network management module 110) through a peer-to-peer client (e.g., another network device in the networks 150-1, 150-2 that has a BT/BLE transceiver). In addition, the BT/BLE receiver of a network device (e.g., the network device 204) may send information (example, responses to commands) to the cloud server 102 (e.g., the network management module 110) via a peer-to-peer client (e.g., another network device in the networks 150-1, 150-2 that has a BT/BLE transceiver). Consequently, the remote manageability of the networks 150-1, 150-2 can be improved and the operational complexity and the need for sending personnel (e.g., a network expert) to a customer location can be reduced.

Network systems, especially in enterprise campuses, are typically deployed in a group consisting of many different units. For example, in a building floor, there may be multiple wireless access points (APs) spread throughout the building floor for robust wireless connectivity, multiple Ethernet switches for backhauling the wireless traffic and for wired connectivity, and multiple sensors for measuring the network performance, etc., which provides a robust environment with multiple network systems that are in close vicinity and can be in short-range wireless communications, e.g., BT/BLE radio reference (RF) reachability. Consequently, there may be one or more neighboring network devices with BT/BLE interfaces that are in the vicinity of a faulty network device that has lost connection to the cloud server 102 (e.g., the network management module 110). In some embodiments, when a faulty network device loses connection to the cloud server 102 (e.g., the network management module 110), the faulty network device enables its BT/BLE transceiver or interface and enters a ready to pair state. One of the neighboring network devices with BT/BLE interfaces that are in the vicinity of a faulty network device in its vicinity can be used to connect to the faulty network device. When a connection is established between a faulty network device and a neighboring network device with a BT/BLE interface that is in the vicinity of the faulty network device, an authentication process can take place to securely authenticate the neighboring network device with the cloud server 102 (e.g., the network management module 110) to establish a secured connectivity for a remote session. Subsequently, the neighboring network device acts as a proxy for management and troubleshooting transaction, which interacts with the cloud server 102 (e.g., the network management module 110) and the faulty network device that has lost direct connection to the cloud server 102 (e.g., the network management module 110). For example, a neighboring network device, which is connected to the faulty network device via a BT/BLE connection and to the cloud server 102 (e.g., the network management module 110) through another network connection (e.g., a wired connection, such as, an Ethernet connection and/or a wireless connection such as a WLAN connection), can receive execution result information of an instruction by the faulty network device and send or relay the execution result information to the cloud server 102 (e.g., the network management module 110) for evaluation. Consequently, using a neighboring network device, the cloud server 102 (e.g., the network management module 110) can perform remote management and troubleshooting of an orphaned network device without requiring on-site personnel to perform remote management and troubleshooting of the orphaned network device.

In some embodiments, the cloud server 102 (e.g., the network management module 110 of the cloud server 102) includes memory and one or more processors. In some embodiments, the network management module 110 (e.g., one or more processors of the network management module 110) is configured to connect to a neighboring network device of a faulty network device, where the neighboring network device and the faulty network device are located within a network deployed at a customer site, and where the neighboring network device communicates with the faulty network device according to a short-range wireless communications protocol, and perform a network device troubleshooting operation on the faulty network device using the neighboring network device as a proxy. In some embodiments, the short-range wireless communications protocol includes a Bluetooth (BT) or Bluetooth Low Energy (BLE) communications protocol. In some embodiments, network devices are neighboring if the network devices are able to successfully communicate according to a short-range Ultra high frequency (UHF) communications protocol, such as, a BT or BLE communications protocol. In some embodiments, a faulty network device is a network device that loses its communications connection with the cloud server, for example, because of a communications error, a software error, or some other error that cause the network device to go into a "fault" mode but can still be reachable via a short-range UHF communications protocol, such as, a BT or BLE communications protocol, by at least one neighboring network device. The network management database may be configured to store a short-range wireless reachability database (e.g., a BT or BLE reachability database) of the network. In some embodiments, the network management module 110 (e.g., one or more processors of the network management module 110) is further configured to transmit an instruction to be executed by the faulty network device to the neighboring network device. In some embodiments, the network management module 110 (e.g., one or more processors of the network management module 110) is further configured to cause the neighboring network device to turn on a BT or BLE transceiver to connect to a corresponding BT or BLE transceiver of the faulty network device under a client mode. In some embodiments, the network management module 110 (e.g., one or more processors of the network management module 110) is further configured to cause the neighboring network device to forward the instruction to the faulty network device, after the neighboring network device is successfully connected to the faulty network device under the client mode. In some embodiments, the instruction includes a media access control (MAC) address of the faulty network device. In some embodiments, the network management module 110 (e.g., one or more processors of the network management module 110) is further configured to receive execution result information of the instruction by the faulty network device from the neighboring network device. For example, a neighboring network device, which is connected to the faulty network device via a BT/BLE connection and to the cloud server 102 (e.g., the network management module 110) through another network connection (e.g., a wired connection, such as, an Ethernet connection and/or a wireless connection such as a WLAN connection), can receive execution result information of an instruction by the faulty network device and send or relay the execution result information to the cloud server 102 (e.g., the network management module 110) for evaluation. In some embodiments, the network management module 110 (e.g., one or more processors of the network management module 110) is further configured to select the neighboring network device from BT or BLE capable network devices in vicinity of the faulty network device based on the BT or BLE reachability database when the faulty network device loses connectivity to the cloud server. In some embodiments, the network management module 110 (e.g., one or more processors of the network management module 110) is further configured to iterate through the BT or BLE capable network devices in vicinity of the faulty network device, one network device at a time. In some embodiments, the network management module 110 (e.g., one or more processors of the network management module 110) is further configured to authenticate the neighboring network device to establish a secured connection with the neighboring network device. In some embodiments, a network device includes a controller configured to receive a notification of a faulty network device in vicinity of the network device from a cloud server and a BT or BLE transceiver configured to connect to a corresponding BT or BLE transceiver of the faulty network device under a client mode, receive an instruction to be executed by the faulty network device from the cloud server and forward the instruction to the faulty network device after the network device is successfully connected to the faulty network device under the client mode, and receive execution result information of the instruction by the faulty network device from the neighboring network device.

Figure 3:
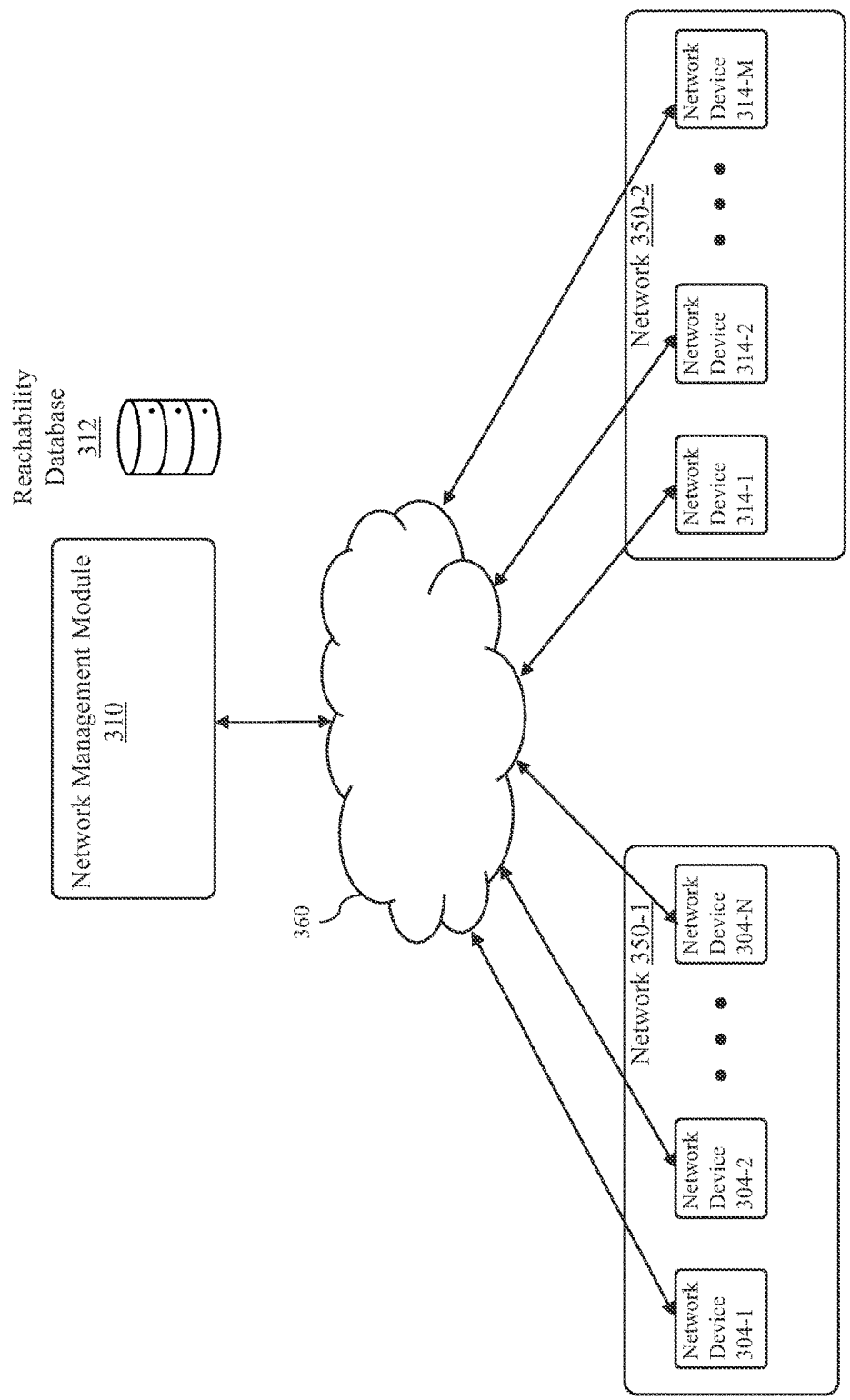
FIG. 3 depicts a network management module that communicates with networks.

FIG. 3 depicts a network management module 310 that communicates with deployed networks 350-1, 350-2 via a network 360 (e.g., the Internet). The network management module 310 may be an embodiment of the network management module 110 depicted in FIG. 1, while the networks 350-1, 350-2 may be embodiments of the networks 150-1, 150-2 depicted in FIG. 1. However, the network management module 110 and the networks 150-1, 150-2 depicted in FIG. 1 are not limited to the embodiment depicted in FIG. 3. In the embodiment depicted in FIG. 3, the network 350-1 includes one or more network devices 304-1, . . . , 304-N, where N is a positive integer, while the network 350-2 includes one or more network devices 314-1, . . . , 314-M, where M is a positive integer. Each of the networks 350-1, 350-2 may include any least two network devices that include BT/BLE transceivers that are in the vicinity of each other.

In some embodiments, network devices in a network (e.g., the network devices 304-1, . . . , 304-N in the network 350-1 or the network devices 314-1, . . . , 314-M in the network 350-2) generate a report of other network devices with BT/BLE reachability in the vicinity. The generation of a reachability report can be performed infrequently, for instance, when all the network systems have been installed at a premise or when a new system installation or replacement occurs. In some embodiments, the generation of a reachability report is performed periodically, for example, once a month (e.g., on a specific weekend) or during periods of low activity. In some embodiments, the generation of a reachability report is orchestrated by the network management module 310 on as-needed basis. In some embodiments, to generate a reachability report, BT/BLE transceivers or interfaces on all the network devices in a network (e.g., the network devices 304-1, . . . , 304-N in the network 350-1 or the network devices 314-1, . . . , 314-M in the network 350-2) are turned on and advertise their names and services. For example, the network devices find other BT/BLE network systems in the vicinity and create a reachability database 312, which includes information such as system names, advertised services, signal strength, and/or other relevant data. The network devices can send back the list of all neighborhood network devices reachable via BT/BLE to the network management module 310. The network management module 310 can use the received lists of neighborhood network devices reachable via BT/BLE to generate a BT/BLE reachability topology map with weights for preferred ones based on, for example, signal strengths, and store the BT/BLE reachability topology map in the reachability database 312. Once a reachability report of network devices in a network (e.g., the network devices 304-1, . . . , 304-N in the network 350-1 or the network devices 314-1, . . . , 314-M in the network 350-2) is completed, the BT/BLE transceivers or interfaces of the network devices in the network can be turned off. In some embodiments, the network management module 310 uses its own physical location information, such as floorplan information of the customer site 114, to generate a list of network devices in the vicinity and use the list of network devices in the vicinity as the reachability topology database. Alternatively, the network management module 310 can use the list of reachable network devices in the vicinity that is generated based on the physical location information of the network management module 310, to validate and check the list of reachable network devices in the vicinity that is generated by all of the network devices in a network (e.g., the network devices 304-1, . . . , 304-N in the network 350-1 or the network devices 314-1, . . . , 314-M in the network 350-2).

Figure 4:
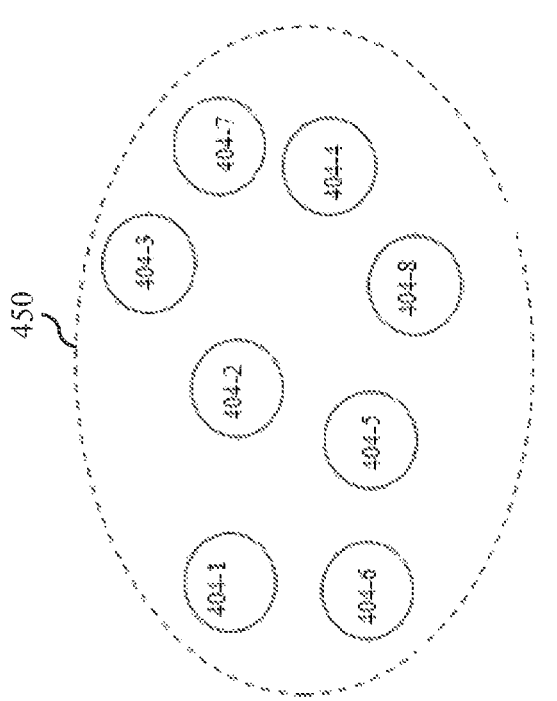
FIG. 4 depicts a network, which is an embodiment of networks depicted in FIG. 3.

FIG. 4 depicts a network 450, which is an embodiment of the networks 350-1, 350-2 depicted in FIG. 3. However, the networks 350-1, 350-2 depicted in FIG. 3 are not limited to the embodiment depicted in FIG. 4. In the embodiment depicted in FIG. 4, the network 450 includes eight network devices 404-1, . . . , 404-8. Among the eight network devices 404-1, . . . , 404-8, the network devices 404-1, 404-2, 404-3, 404-4, 404-5, 404-8 include BT/BLE transceivers that are in the vicinity of each other.

Figure 5:
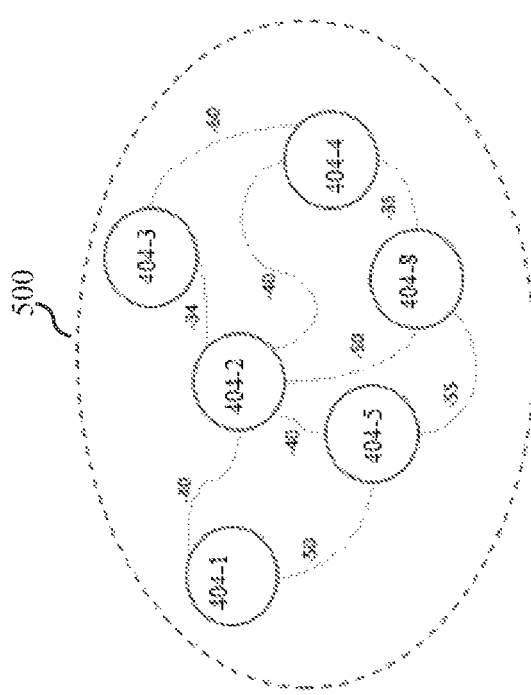
FIG. 5 depicts a BT/BLE reachability topology map of the network depicted in FIG. 4.

FIG. 5 depicts a BT/BLE reachability topology map 500 of the network 450 depicted in FIG. 4. The network management module 310 can use lists of neighborhood network devices reachable via BT/BLE to generate the BT/BLE reachability topology map 500 and store the BT/BLE reachability topology map in the reachability database 312. In the embodiment depicted in FIG. 5, the BT/BLE reachability topology map 500 includes the network devices 404-1, 404-2, 404-3, 404-4, 404-5, 404-8 with signal strength between different network devices.

Table 1 provides an example BT/BLE reachability database that corresponds to the BT/BLE reachability topology map 500 depicted in FIG. 5. In Table 1, device names, reachable device names, and BT/BLE signal strength between the devices and reachable devices are listed. For example, the BT/BLE signal strength between the network device 404-1 and the network device 404-2 is −40 dB.

TABLE 1

| Device Name | Reachable Device Name | Signal Strength (dB) |
| --- | --- | --- |
| 404-1 | 404-2 | −40 |
| 404-1 | 404-5 | −50 |
| 404-2 | 404-3 | −34 |
| 404-2 | 404-5 | −40 |
| 404-2 | 404-8 | −50 |
| 404-3 | 404-4 | −60 |
| 404-4 | 404-8 | −35 |
| 404-5 | 404-8 | −55 |

In some embodiments, based on a BT/BLE reachability database (e.g., the BT/BLE reachability database 312) of network devices in a network (e.g., the network devices 304-1, . . . , 304-N in the network 350-1 or the network devices 314-1, . . . , 314-M in the network 350-2), a peer-to-peer BT/BLE session is initiated whenever a faulty network device loses connectivity to the network management module 310. If a faulty network device is not able to reach the network management module 310, the BT/BLE transceiver of the faulty network device is automatically turned on. A faulty network device may be shown in the BT/BLE Topology database even though the faulty network device is not connected to the network management module 310. In some embodiments, for operational configuration or troubleshooting, the network management module 310 or an operator runs at least one command on a faulty network device. The network management module 310 may select the faulty network device and run one or more commands via BT/BLE. The network management module 310 may already have the list of neighboring network devices from which the faulty network device can be reached via BT/BLE. In some embodiments, the network management module 310 iterates through a list of reachable network devices in the vicinity of the faulty network device, one network device at a time, for example, until it succeeds, to reach and send commands to a suitable neighboring network device to execute a command on the faulty network device via BT/BLE with an active neighboring network device acting as a proxy to send the command to the peer faulty network device.

Figure 6:
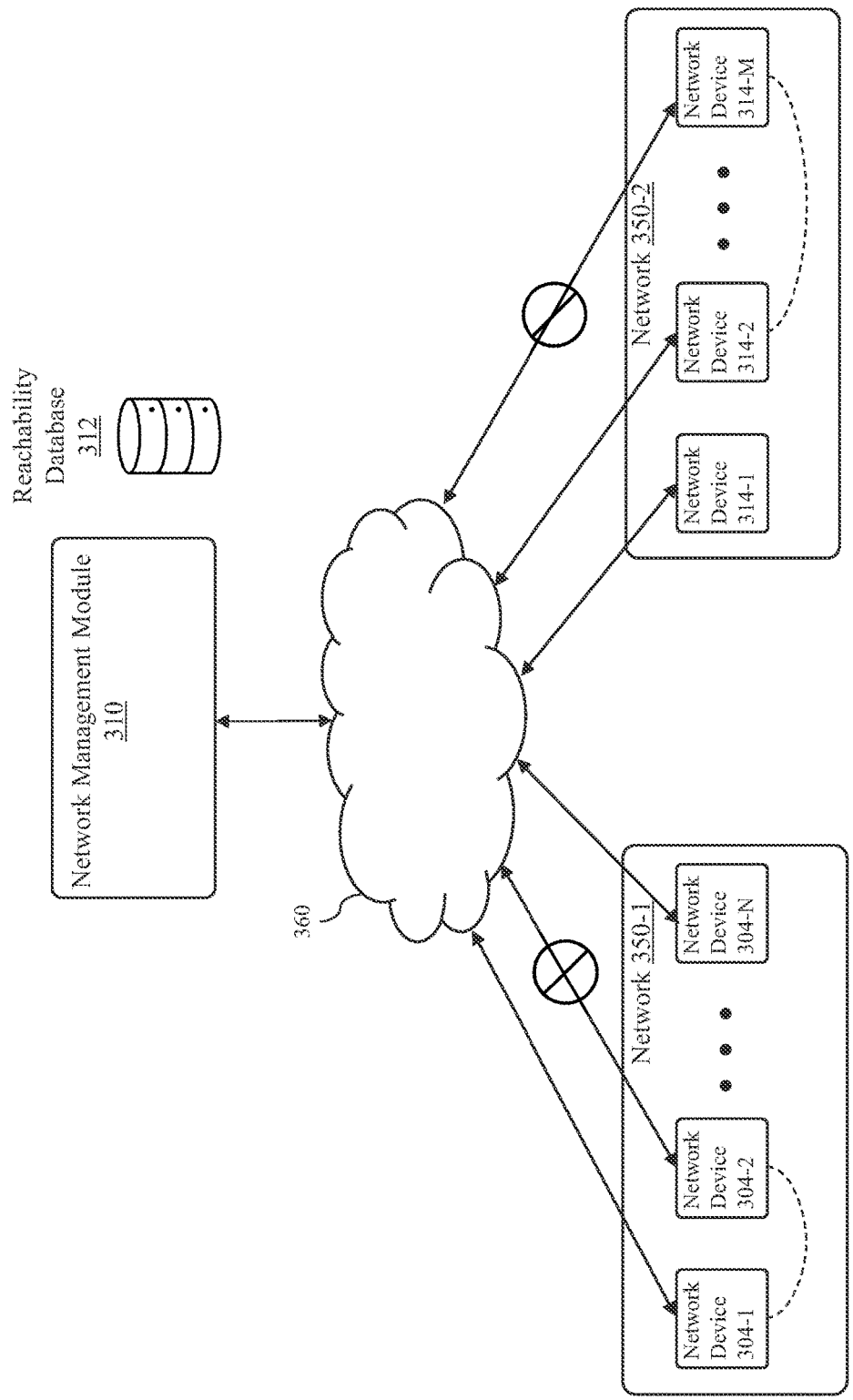
FIG. 6 depicts the network depicted in FIG. 4 with faulty network devices that communicate through neighboring network devices, which are in the vicinity of the faulty network service.

FIG. 6 depicts the network 450 depicted in FIG. 4 with faulty network devices 304-2, 414-M that communicate through neighboring network devices 304-1, 414-2, respectively, which are in the vicinity of the faulty network service. Based on the BT/BLE reachability database 312, a peer-to-peer BT/BLE session is initiated when the faulty network device 304-2 or 414-M loses connectivity to the network management module 310. If a faulty network device 304-2 or 414-M is not able to reach the network management module 310, the BT/BLE transceiver of the faulty network device 304-2 or 414-M is automatically turned on. The network management module 310 may select the faulty network device 304-2 or 414-M and run one or more commands via BT/BLE. The network management module 310 iterates through a list of reachable network devices in the vicinity of the faulty network device 304-2 or 414-M, one network device at a time, for example, until it succeeds, to reach and send commands to a suitable neighboring network device 304-1 or 414-2 to execute a command on the faulty network device 304-2 or 414-M via BT/BLE with an active neighboring network device 304-1 or 414-2 acting as a proxy to send the command to the peer faulty network device 304-2 or 414-M.

In some embodiments, when a neighboring network device 304-1 or 414-2, which is connected to the network management module 310, receives an instruction (e.g., a command or action to execute) via BT/BLE, the neighboring network device 304-1 or 414-2 turns on its BT/BLE transceiver and switches to a client mode and tries to connect to the faulty network device 304-2 or 414-M. For example, the command may include information of a faulty network device 304-2 or 414-M and a media access control (MAC) address of the faulty network device 304-2 or 414-M. If the connection between the neighboring network device 304-1 or 414-2 and the faulty network device 304-2 or 414-M is successful, the neighboring network device 304-1 or 414-2 can report the result to the network management module 310. For example, the neighboring network device 304-1, which is connected to the faulty network device 304-2 via a BT/BLE connection and to the network management module 310 through another network connection (e.g., a wired connection, such as, an Ethernet connection and/or a wireless connection such as a WLAN connection), can forward an instruction from the network management module 310 to the faulty network device 304-2, receive execution result information of the instruction by the faulty network device 304-2, and send or relay the execution result information to the network management module 310 for evaluation. In some embodiments, the neighboring network device 414-2, which is connected to the faulty network device 414-M via a BT/BLE connection and to the network management module 310 through another network connection (e.g., a wired connection, such as, an Ethernet connection and/or a wireless connection such as a WLAN connection), forwards an instruction from the network management module 310 to the faulty network device 414-M, receives execution result information of the instruction by the faulty network device 414-M, and sends or relays the execution result information to the network management module 310 for evaluation. Consequently, the remote manageability is improved and the operational complexity and the need for sending personnel to the location is reduced, which helps to improve mean time to repair for faulty systems, and potentially improves Service Level Agreement (SLA) parameters, such as, up time, availability, and serviceability, and reduces cost of operations.

Figure 7:
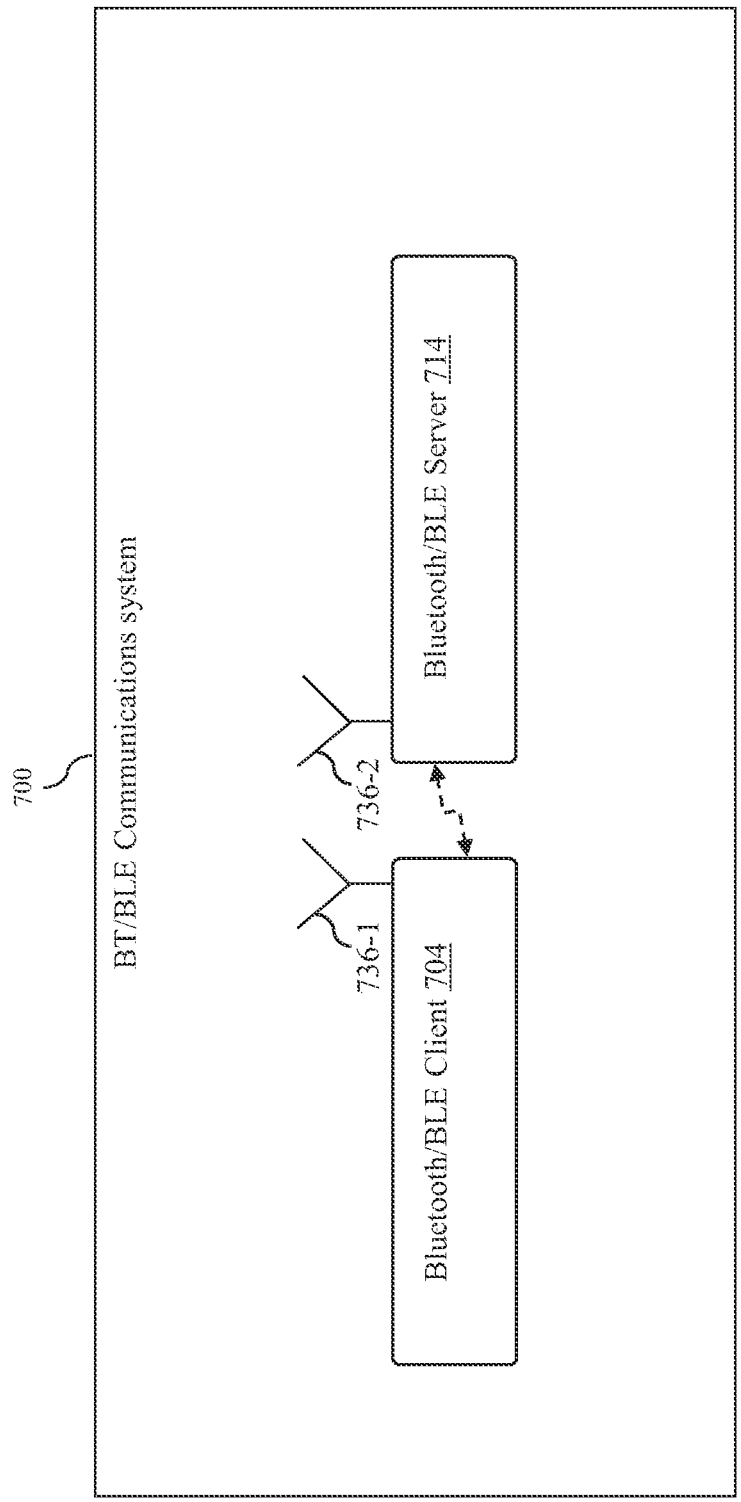
FIG. 7 depicts a BT/BLE communications system that includes a BT/BLE client and a BT/BLE server.

FIG. 7 depicts a BT/BLE communications system 700 that includes a BT/BLE client 704 and a BT/BLE server 714. The BT/BLE client 704 and the BT/BLE server 714 may be an embodiment of a network device that is included in the deployed networks 350-1, 350-2 depicted in FIG. 3. However, network devices that can be included in the deployed networks 350-1, 350-2 depicted in FIG. 3 are not limited to the embodiment depicted in FIG. 7. The BT/BLE client 704 and/or the BT/BLE server 714 may be the same as or similar to the network device 204 depicted in FIG. 2. In the embodiment depicted in FIG. 7, the BT/BLE client 704 uses a BT/BLE antenna 736-1 to communicate with the BT/BLE server 714 via a BT/BLE antenna 736-2. In some embodiments, the BT/BLE server 714 is a faulty network service (e.g., the network device 304-2 or the network device 414-M) and the BT/BLE client 704 is a neighboring network device (e.g., the network device 304-1 or the network device 414-2) that is in the vicinity of the faulty network service.

In some embodiments, BT/BLE transceivers of network devices in a network (e.g., the network devices 304-1, ..., 304-N in the network 350-1 or the network devices 314-1, ..., 314-M in the network 350-2) are also used for configuration and provisioning or metrics and statistics collection remotely via a neighbor network device, when a network device loses its direct connection with the network management module 310. For example, BT/BLE transceivers of network devices in a network (e.g., the network devices 304-1, ..., 304-N in the network 350-1 or the network devices 314-1, ..., 314-M in the network 350-2) are used for remote system configuration, using a neighboring network device as a proxy when a direct connection with the network management module 310 is lost. BT/BLE transceivers of network devices in a network (e.g., the network devices 304-1, ..., 304-N in the network 350-1 or the network devices 314-1, ..., 314-M in the network 350-2) can also be used for remote assistance of on-site personnel during installation or complex troubleshooting scenarios. BT/BLE transceivers of network devices in a network (e.g., the network devices 304-1, ..., 304-N in the network 350-1 or the network devices 314-1, ..., 314-M in the network 350-2) can also be used to simplify network system configuration especially for Zero Touch Provisioning of systems by discovering neighbors and peers and exchanging configuration information via BT/BLE peer, which is remotely managed.

Figure 8:
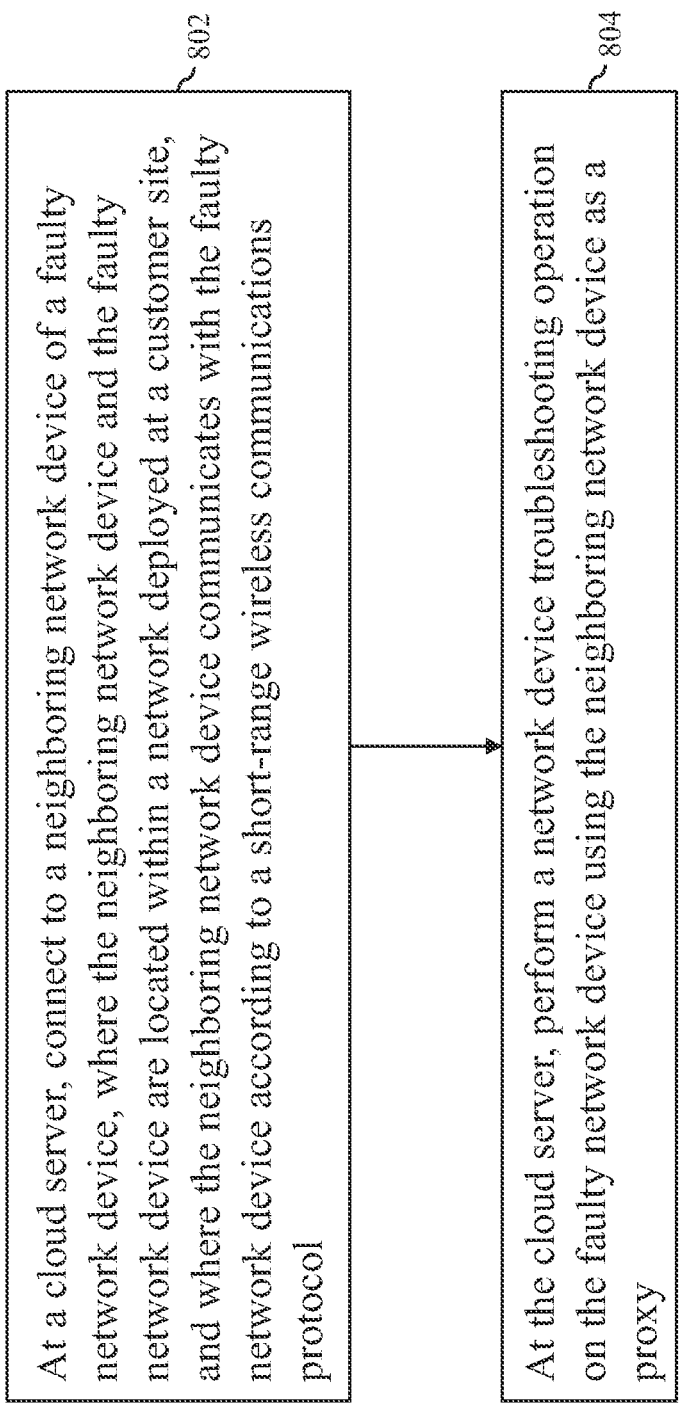
FIG. 8 is a process flow diagram of a method for network device troubleshooting accordance to an embodiment of the invention.

FIG. 8 is a process flow diagram of a method for network device troubleshooting accordance to an embodiment of the invention. According to the method, at block 802, at a cloud server, a neighboring network device of a faulty network device is connected to. The neighboring network device and the faulty network device are located within a network deployed at a customer site, and the neighboring network device communicates with the faulty network device according to a short-range wireless communications protocol. At block 804, at the cloud server, a network device troubleshooting operation is performed on the faulty network device using the neighboring network device as a proxy. In some embodiments, the short-range wireless communications protocol includes a Bluetooth (BT) or Bluetooth Low Energy (BLE) communications protocol. In some embodiments, at the cloud server, an instruction to be executed by the faulty network device is transmitted to the neighboring network device. In some embodiments, the neighboring network device is caused to turn on a BT or BLE transceiver to connect to a corresponding BT or BLE transceiver of the faulty network device under a client mode. In some embodiments, the neighboring network device is caused to forward the instruction to the faulty network device, after the neighboring network device is successfully connected to the faulty network device under the client mode. In some embodiments, the instruction includes a MAC address of the faulty network device. In some embodiments, at the cloud server, execution result information of the instruction by the faulty network device is received from the neighboring network device. In some embodiments, at the cloud server, a BT or BLE reachability database of the network is generated. In some embodiments, at the cloud server, the neighboring network device is selected from BT or BLE capable network devices in vicinity of the faulty network device based on the BT or BLE reachability database when the faulty network device loses connectivity to the cloud server. In some embodiments, at the cloud server, the BT or BLE capable network devices in vicinity of the faulty network device are iterated through, one network device at a time. In some embodiments, at the cloud server, the neighboring network device is authenticated to establish a secured connection with the neighboring network device. The cloud server may be similar to, the same as, or a component of the cloud server 102 depicted in FIG. 1. The network may be similar to, the same as, or a component of the network 150-1 or 150-2 depicted in FIG. 1 and/or the network 350-1 or 350-2 depicted in FIG. 3. The customer site may be similar to, the same as, or a component of the customer site 114 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for network device troubleshooting, the method comprising:
　at a cloud server, connecting to a neighboring network device of a faulty network device, wherein the neighboring network device and the faulty network device are located within a network deployed at a customer site, and wherein the neighboring network device communicates with the faulty network device according to a short-range wireless communications protocol; and
　at the cloud server, performing a network device troubleshooting operation on the faulty network device using the neighboring network device as a proxy,
　wherein the method further comprises:
　at the cloud server, generating a Bluetooth (BT) or Bluetooth Low Energy (BLE) reachability database of the network; and
　at the cloud server, selecting the neighboring network device from a plurality of BT or BLE capable network devices in vicinity of the faulty network device based on the BT or BLE reachability database when the faulty network device loses connectivity to the cloud server.

2. The method of claim 1, wherein the short-range wireless communications protocol comprises a Bluetooth (BT) or Bluetooth Low Energy (BLE) communications protocol, and wherein at the cloud server, performing the network device troubleshooting operation on the faulty network device using the neighboring network device as the proxy comprises transmitting an instruction to be executed by the faulty network device to the neighboring network device.

3. The method of claim 2, wherein at the cloud server, performing the network device troubleshooting operation on the faulty network device using the neighboring network device as the proxy further comprises causing the neighboring network device to turn on a BT or BLE transceiver to connect to a corresponding BT or BLE transceiver of the faulty network device under a client mode.

4. The method of claim 3, wherein at the cloud server, performing the network device troubleshooting operation on the faulty network device using the neighboring network device as the proxy comprises causing the neighboring network device to forward the instruction to the faulty network device, after the neighboring network device is successfully connected to the faulty network device under the client mode.

5. The method of claim 2, wherein the instruction comprises a media access control (MAC) address of the faulty network device.

6. The method of claim 2, wherein at the cloud server, performing the network device troubleshooting operation on the faulty network device using the neighboring network device as the proxy comprises at the cloud server, receiving execution result information of the instruction by the faulty network device from the neighboring network device.

7. The method of claim 1, wherein at the cloud server, selecting the neighboring network device from the BT or BLE capable network devices in vicinity of the faulty network device based on the BT or BLE reachability database when the faulty network device loses connectivity to the cloud server comprises at the cloud server, iterating through the BT or BLE capable network devices in vicinity of the faulty network device, one network device at a time.

8. The method of claim 1, further comprising at the cloud server, authenticating the neighboring network device to establish a secured connection with the neighboring network device.

9. A cloud server, the cloud server comprising:
a network management module configured to:
   connect to a neighboring network device of a faulty network device, wherein the neighboring network device and the faulty network device are located within a network deployed at a customer site, and wherein the neighboring network device communicates with the faulty network device according to a short-range wireless communications protocol; and
   perform a network device troubleshooting operation on the faulty network device using the neighboring network device as a proxy; and
a network management database connected to the network management module and configured to store a short-range wireless reachability database of the network,
wherein the cloud server comprises a processor, wherein the short-range wireless communications protocol comprises a Bluetooth (BT) or Bluetooth Low Energy (BLE) communications protocol, and wherein the network management module is further configured to transmit and instruction to be executed by the faulty network device to the neighboring network device, wherein the short-range wireless reachability database comprises a BT or BLE reachability database of the network, and wherein the network management module is further configured to select the neighboring network device from a plurality of BT or BLE capable network devices in vicinity of the faulty network device based on the BT or BLE reachability database when the faulty network device loses connectivity to the cloud server.

10. The cloud server of 9, wherein the network management module is further configured to cause the neighboring network device to turn on a BT or BLE transceiver to connect to a corresponding BT or BLE transceiver of the faulty network device under a client mode.

11. The cloud server of claim 10, wherein the network management module is further configured to cause the neighboring network device to forward the instruction to the faulty network device, after the neighboring network device is successfully connected to the faulty network device under the client mode.

12. The cloud server of claim 9, wherein the instruction comprises a media access control (MAC) address of the faulty network device.

13. The cloud server of claim 9, wherein the network management module is further configured to receive execution result information of the instruction by the faulty network device from the neighboring network device.

14. The cloud server of claim 9, wherein the network management module is further configured to iterate through the BT or BLE capable network devices in vicinity of the faulty network device, one network device at a time.

15. The cloud server of claim 9, wherein the network management module is further configured to authenticate the neighboring network device to establish a secured connection with the neighboring network device.

16. A network device, the network device comprising:
a controller configured to receive a notification of a faulty network device in vicinity of the network device from a cloud server; and
a short-range wireless transceiver configured to:
   connect to a corresponding short-range wireless transceiver of the faulty network device under a client mode;
   receive an instruction to be executed by the faulty network device from the cloud server and forward the instruction to the faulty network device after the network device is successfully connected to the faulty network device under the client mode; and
   receive execution result information of the instruction by the faulty network device,
wherein at the cloud server, a Bluetooth (BT) or Bluetooth Low Energy (BLE) reachability database of a network is generated, and wherein at the cloud server, the network device is selected from a plurality of BT or BLE capable network devices in vicinity of the faulty network device based on the BT or BLE reachability database when the faulty network device loses connectivity to the cloud server.

* * * * *